United States Patent [19]

Tansill

[11] Patent Number: 4,615,455

[45] Date of Patent: Oct. 7, 1986

[54] EXPLOSION-RESISTANT FUEL TANK DEVICE

[76] Inventor: Horace A. Tansill, P.O. BOX 480, Santa Barbara, Calif. 93102

[21] Appl. No.: 795,027

[22] Filed: Nov. 4, 1985

[51] Int. Cl.⁴ ............................................. B65D 25/14
[52] U.S. Cl. ................................... 220/88 R; 220/85 B
[58] Field of Search .................. 220/88 R, 85 B, 85 S; 222/95, 214

[56] References Cited

U.S. PATENT DOCUMENTS

| | | |
|---|---|---|
| 2,850,083 | 9/1958 | Frost . |
| 2,968,318 | 1/1961 | Bauman ............................ 220/85 B |
| 3,075,576 | 1/1963 | Herbert ............................ 220/85 B |
| 3,209,680 | 10/1965 | McGinnis ......................... 220/85 B |
| 3,477,611 | 11/1969 | Niles ................................. 220/85 B |
| 3,561,639 | 2/1971 | Allen ................................ 220/88 R |
| 3,567,536 | 3/1971 | Wickersham, Jr. ........... 220/88 R X |
| 3,693,825 | 9/1972 | Richman ....................... 220/85 B X |
| 3,708,330 | 1/1973 | Harr .............................. 220/88 R X |
| 3,804,292 | 4/1974 | Chiti . |
| 4,134,491 | 1/1979 | Turillon et al. .............. 220/88 R X |
| 4,292,270 | 10/1981 | Wyeth . |

Primary Examiner—Steven M. Pollard
Attorney, Agent, or Firm—Millen & White

[57] ABSTRACT

An explosion resistant fuel tank comprises an explosion resistant insert, which comprises a compressible resilient structure. The structure is placed within a conventional fuel tank, and has interconnecting capillary-sized cells for containing a liquid fuel. The cells have equivalent cross-sectional diameters of no more than about 0.005 inch. The fuel tank also comprises means for compressing the compressible structure to a reduced volume so that the liquid fuel contained therein passes out of the compressible structure. In one version, the compressible structure is a sponge. In another version, the compressible structure comprises an elongated honeycomb structure having elongated tubular cells lined up side by side. The honeycomb is substantially incompressible along the length of the tubular cells.

31 Claims, 9 Drawing Figures

EXPLOSION-RESISTANT FUEL TANK DEVICE

CROSS-REFERENCE TO RELATED APPLICATION

This application is related to U.S. Ser. No. 792,743, filed on Oct. 30, 1985, which disclosure is incorporated by reference herein.

BACKGROUND OF THE INVENTION

This invention relates to an explosion resistant fuel tank.

It is common knowledge that conventional fuel tanks on vehicles such as cars, boats and aircrafts can explode on severe impact. The liquid fuels generally used in these vehicles, such as gasoline or aviation fuel, are relatively volatile. When the fuel tank becomes ruptured on impact, the force of the impact can cause the fuel to be ejected violently from the tank, often splashing over a large area. The resulting increase in evaporation surface area leads to rapid volatilization. The mixture of the fuel vapors and the oxygen in the air can be dangerous. The mixture can be set off by the smallest of sparks or open fires to cause a serious explosion. Many travelers have died a fiery death from exploding fuel tanks. What is needed is a fuel tank which is less prone to explode on impact.

SUMMARY

The present invention satisfies this need by incorporating an explosion resistant insert within a conventional fuel tank container. The insert comprises a compressible, resilient structure comprising a plurality of cells for containing a liquid fuel. The compressible structure decreases in volume from a first volume to a reduced second volume when subjected to a compressive force, the reduced second volume being no more than about 75% of the first volume. Compression of the structure forces the liquid fuel to flow out of the structure. The compressible structure is sufficiently resilient that when the compressive force is released the structure returns to have the first volume for soaking up additional liquid fuel.

Preferably the compressible structure is formed of a non-wicking, non-combustible material which is compatible with the liquid fuel. Preferably the cells in the compressible structure are capillary sized with equivalent cross-sectional diameters of no more than about 0.005 inch. Preferably the compressible structure is formed of a heat-shrinkable material such that its surface deforms when exposed to temperatures higher than about 150° C. to become impervious to the liquid fuel.

In one preferred version, the compressible structure is an open pore sponge. In another preferred version, the compressible structure is an elongated honeycomb structure comprising elongated tubular cells, the honeycomb structure being substantially incompressible along at least one of its dimensions. The cross-section of the cells need not be hexagonal. Both the size of the pores of the sponge and the cross-sectional dimension of the tubular cells are preferably less than about 0.005 inch, measured as equivalent cross-sectional diameter. In the honeycomb version, the fuel tank fuel tank is oriented so that the substantially incompressible dimension of the honeycomb is in line with the usual direction of travel of the vehicle fitted with the fuel tank fuel tank.

The compression means can comprise an inflatable bag placed inside the container and proximate to the compressible structure, and means for inflating the bag so as to apply compressive forces on the compressible structure. There can also be more than one inflatable bag and more than one compressible structure, with each compressible structure being placed between two bags, or between a bag and the wall of the container. In the case of the honeycomb, preferably the compressive forces are substantially transverse to the incompressible dimension of the honeycomb.

In another version, the insert further comprises a flexible bladder inside the container. The bladder has an inlet and an outlet. The compressible structure is inside the bladder. Preferably the compressible structure substantially fills the bladder and is capable of swelling to a volume larger than that of the bladder, for soaking up additional liquid fuel. Preferably the bladder is formed of a rupture resistant, non-combustible material compatible with the liquid fuel.

In the version equipped with the flexible bladder, the compressive means preferably comprise means biasing the pressures at the outlet and the outside of the bladder, such that both the bladder and the resilient structure therein are compressed to have reduced volumes.

DRAWINGS

These and other features, aspects, and advantages of the present invention will become better understood with reference to the following description, appended claims, and accompanying drawings where:

The drawings are not to scale.

DESCRIPTION

The present invention incorporates an explosion resistant insert within a conventional fuel tank container. The container usually comprises a metal shell in the shape of a tank, but can also be made of suitable plastics or other materials. The insert comprises a compressible structure comprising a plurality of cells for containing a liquid fuel. The compressible structure decreases in volume from a first volume to a reduced second volume when subject to a compressive force, the reduced second volume being no more than about 75% of the first volume. The compressible structure has inherent memory and resiliency, and is capable of regaining its first volume when the compressive forces are removed for soaking up additional liquid fuel. Preferably the compressible structure has capillary sized cells so that the liquid fuel is usually held within the compressible struction by capillary action. By "capillary sized cells" it is meant that the cells each have an equivalent cross-sectional diameter of no more than about 0.005 inch. Equivalent cross-sectional diameter, D, is defined as:

$$D = \sqrt{4A/\pi}$$

where A is the cross sectional area of the cell. There are also means for compressing the compressible structure to the reduced second volume such that the liquid fuel passes out of the compressible structure.

Examples of the fuels for which the invention is useful are gasoline, diesel fuel, kerosene, aviation fuels, etc. Examples of vehicles for which this invention is useful include automobiles, motorcycles, aircrafts, boats, etc.

Figure 1:
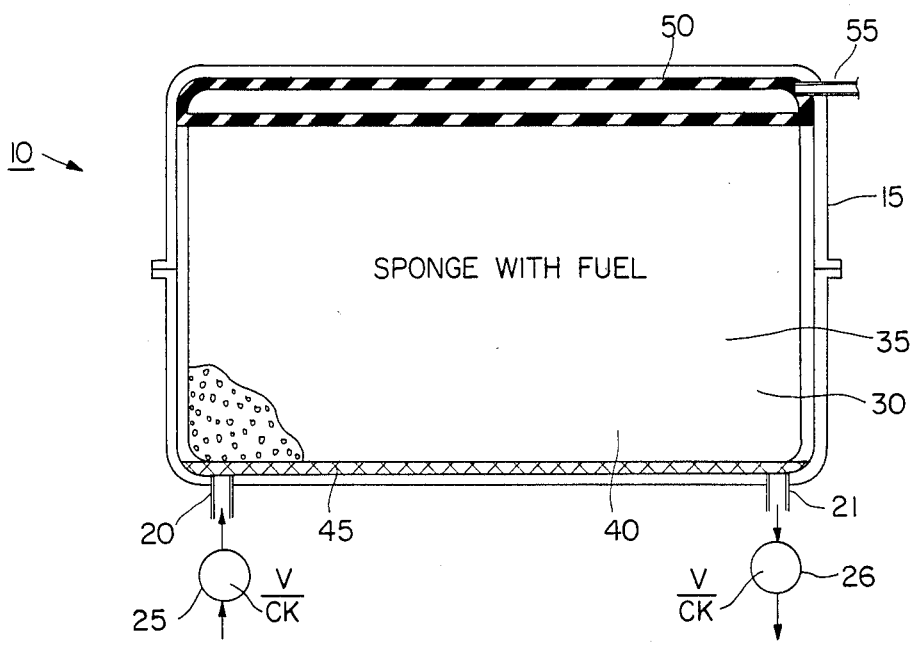
FIG. 1 is a cross-sectional view of a version of the fuel tank of the present invention, comprising a sponge and an inflatable bag, showing the fuel tank fully filled with a liquid fuel.

With reference to FIG. 1, the explosion resistant insert 10 is placed within a conventional fuel tank container 15. The container 15 preferably comprises an inlet 20 and an outlet 21 which are preferably fitted with one-way flow valves 25 and 26, respectively. Preferably the inlet and outlet are on the bottom of the container 15. The inlet and outlet can be one and the same.

The insert 10 comprises a compressible resilient structure 30, which can be a sponge 35. Preferably the sponge 35 comprises interconnecting open pores for containing a liquid fuel 40, the pore sizes are no more than about 0.005 inch. The sponge 35 preferably is non-wicking and is formed of a non-combustible material compatible with the liquid fuel. The sponge can be formed of a heat-shrinkable material, wherein the surface of the sponge, when heated to a temperature above about 150° C. shrinks to become impervious to the liquid fuel contained within the sponge.

The sponge 35 rests on a porous support that keeps the sponge from getting into the inlet 20 and outlet 21, and also serves as a distribution header. Support 45 can be a thin layer of wire mesh. The support 45 can be a continuous layer covering the bottom of the container 15. It can also comprise discrete pieces covering the inlet and outlet openings only.

Figure 2:
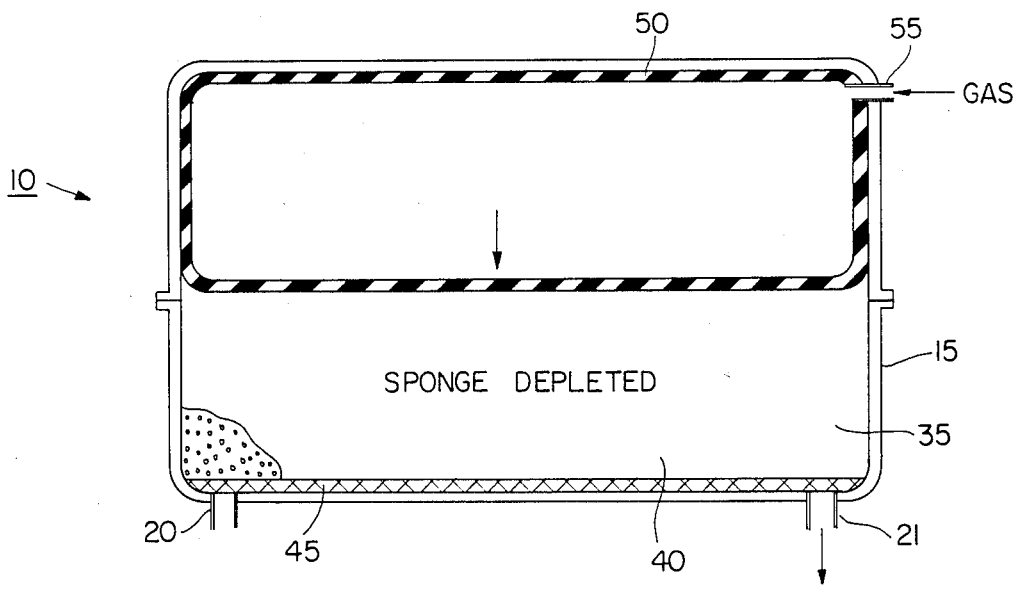
FIG. 2 shows the fuel tank of FIG. 1 except the bag is partially inflated and the fuel tank is partially depleted of fuel.

In a preferred version, the means for compressing sponge 35 comprises an inflatable bag 50 inside the container 15, inflatable through a gas inlet 55. The bag 50 can be inflated with air or other gases, preferably a gas that helps prevent explosions and does not support combustion, such as nitrogen and/or carbon dioxide. The bag 50 is placed proximate to the sponge 35 within the container 15. FIG. 1 shows the bag 50 deflated, when the space within the container 15 is substantially filled by the sponge 35. When bag 50 is inflated, it exerts a compressive force on the sponge 35. As shown in FIG. 2, the sponge 35 is thus compressed from its first volume to a reduced second volume, and the fuel 40 contained therein passes out of container 15 through the outlet 21. There is substantially no air within the container 15, except inside the bag 50.

For larger fuel tanks, more than one compressible structure and more than one inflatable bag can be used. Each compressible structure is preferably sandwiched between two inflatable bags, or between an inflatable bag and the wall of tne container 15. This configuration allows more efficient compression of each compressible structure.

Figure 3:
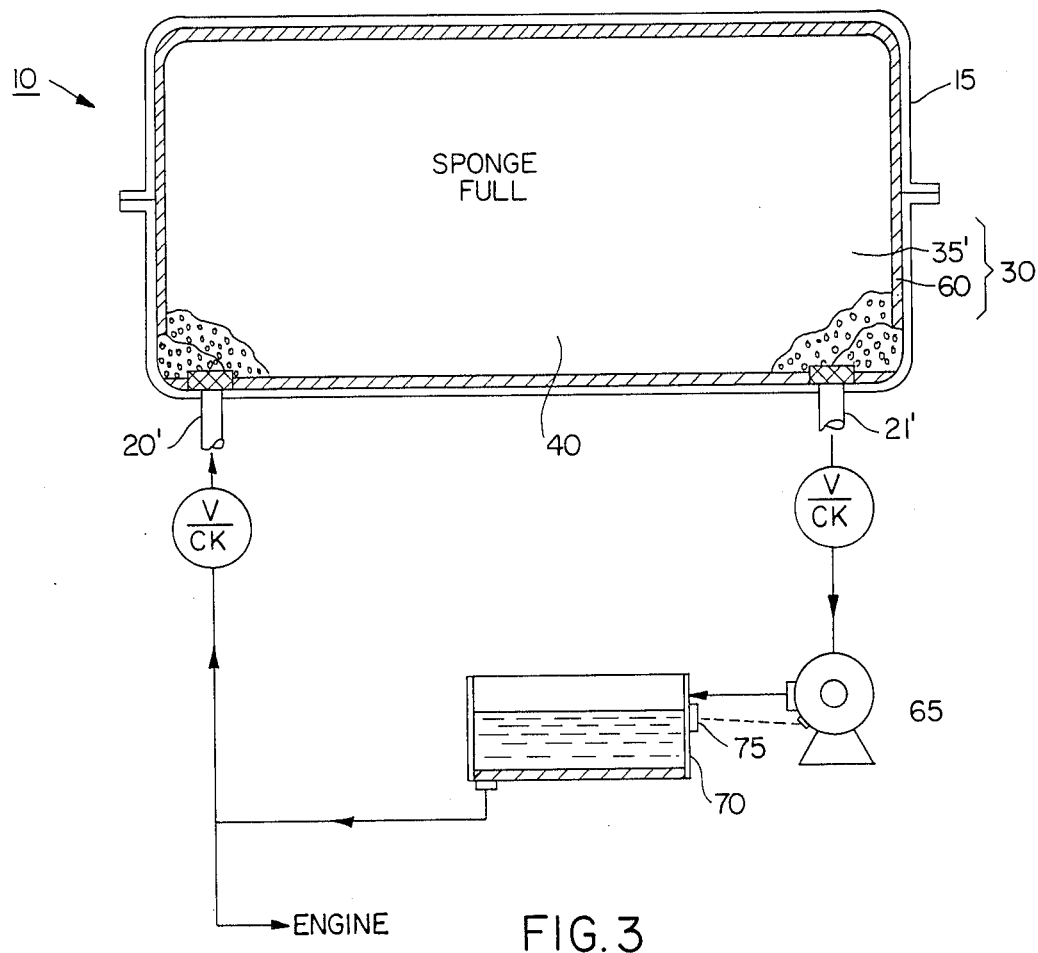
FIG. 3 is a cross-sectional view of another version of the fuel tank of the present invention, comprising a sponge inside a flexible bladder; the figure also includes a simplified schematic representation of the fuel flow.
Figure 4:
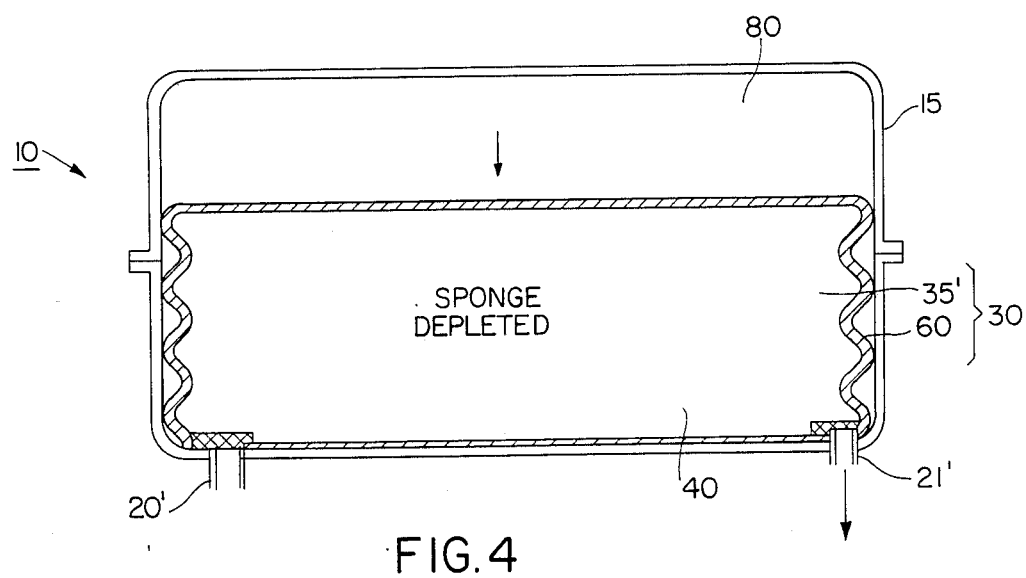
FIG. 4 is the same as FIG. 3 without the schematic, and shows the fuel tank partially depleted of fuel.

In another version of the present invention, as shown in FIGS. 3 and 4, a compressible structure 30 further comprises a flexible bladder 60 inside the container 15. Bladder 60 has an inlet 20' and an outlet 21' extending outside the container 15. The sponge 35' is inside tne bladder 60. The sponge 35' is capable of swelling to a volume larger than that of the bladder, such that when it is released from the bladder, it is capable of soaking up more fuel than when the sponge is inside the bladder. There is no air within the bladder 60 when it is filled with the liquid fuel. The side of bladder 50 in contact with the fuel is formed of a non-combustible material compatible with the liquid fuel. Preferably the bladder 60 comprises at least one layer of rupture resistant material. Suitable rupture resistant materials include Kevlar TM (aromatic polyamide) fabrics, which are generally used in bullet-proof vests, etc.

In this version of the invention, the means for compressing the compressible structure can be a pressure biasing means, such as a pump, for creating a pressure differential between the outlet 21' and the space 80 (FIG. 4) outside of the bladder 60. As shown by the schematic of FIG. 3, the pressure biasing means can be a pump 65 which draws a suction on the outlet 21'. The pressure differential compresses the bladder 60 and the sponge 35 to occupy reduced volumes, as shown in FIG. 4, and the liquid fuel passes out of the container 15. As shown in FIG. 3, the liquid fuel 40 can be pumped by the pump 65 into a reservoir 70, which is equipped with a level sensor 75 which in turn controls the pump 65. The fuel 40 can then be passed to the engine of the vehicle, and can be partly recirculated to the container 15 through inlet 20'.

Alternatively, the pressure differential can be created by pressurizing the space 80 (FIG. 4) between the bladder 60 and the container 15. Yet another alternative is to use the inflatable bag 50 as described above.

Figure 5:
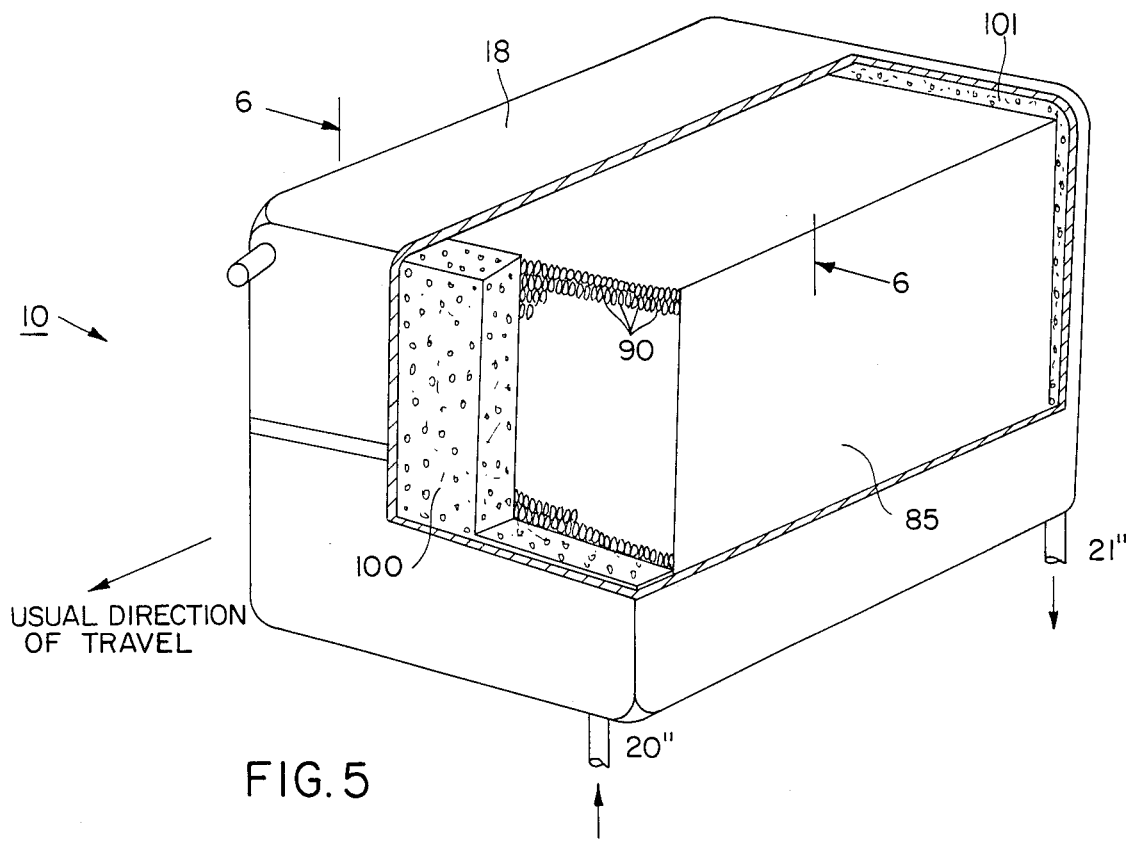
FIG. 5 is a perspective view, partly broken away, of another version of the fuel tank of the present invention, the fuel tank comprising a compressible structure with at least one substantially incompressible dimension, the structure being an elongated honeycomb, the fuel tank also comprising an inflatable bag.

In another version of the present invention, the compressible structure 30 is substantially incompressible along at least one of its dimensions. When installed in the vehicle, the structure 30 is oriented so that its incompressible dimension is substantially in line with the usual direction of travel of the vehicle. Referring to FIG. 5, the compressible structure 30 comprises an elongated honeycomb structure 85 having elongated tubular cells 90 arranged side by side.

Figure 7:
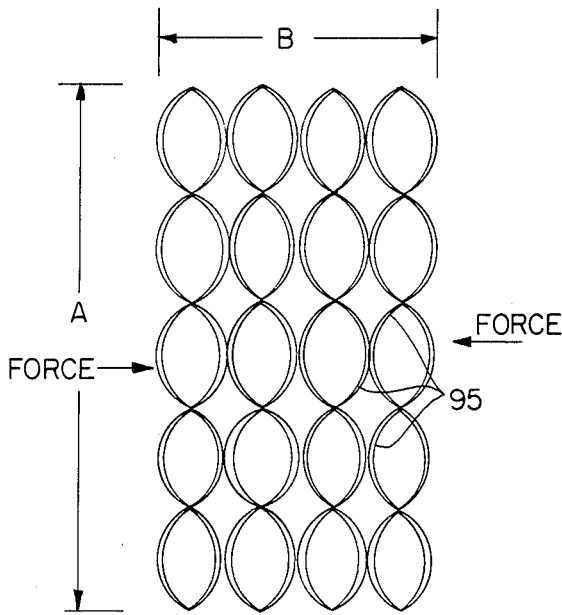
FIG. 7 is an exaggerated view of a portion of the cross-section of the honeycomb structure shown in FIG. 6.
Figure 8:
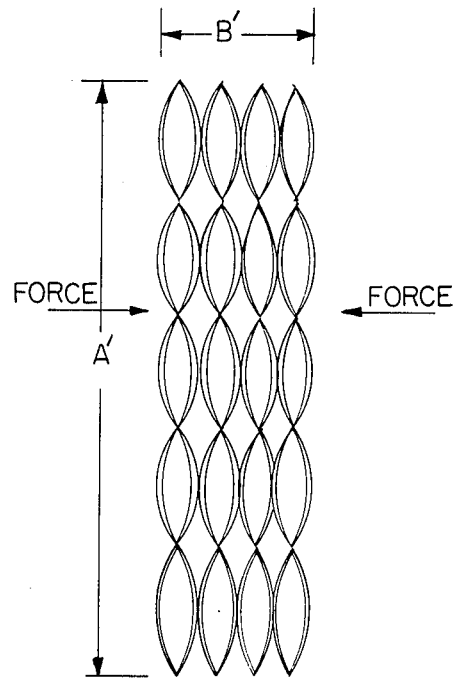
FIG. 8 is the same as FIG. 7 except the honeycomb structure is partly compressed.

Preferably the mean cross-sectional diameter of each cell is no more than about 0.005 inch. The cross-section of the cells need not be hexagonal, although they can be. In fact, the cross-section of the cells can be any convenient shape that allows compression in at least one direction, and provides resiliency and memory such that the honeycomb structure 85 regains its non-compressed volume when the compressive force is released. For example, as shown in FIGS. 7 and 8, the cells each have cross-sections formed from arcs 95. When the compressive forces are applied as shown in FIG. 7 and 8, the arcs flatten. Dimension B decreases and dimension A increases, and the volume of the honeycomb 85 also diminishes. When the compressive forces are released, the arcs regain their original shapes and the honeycomb 40 regains its normal non-compressed first volume.

As shown in FIGS. 7 and 8, the honeycomb 85 is less compressible along dimension A than along dimension B. In aircraft applications, dimension A is preferably oriented substantially vertically, so that sudden changes in altitude due to air turbulences, etc., does not deform the honeycomb structure 85. For this reason, a honeycomb having a cross-section as shown in FIG. 7 and 8 is favored over one having a hexagonal cross-section. A hexagonal cross-section gives substantially uniform compressibility along directions transverse to the axes of the tubular cells, and is undesirable for aircraft applications.

To facilitate fuel flow into and out of the capillary sized cells, there can be headers 100 and 101 on the two ends of the honeycomb 85 as shown in FIG. 5. Each header comprises a porous material, which is preferably compressible. The headers can be formed of the sponge described above. Preferably the inlet 20' and the outlet 21' lead into the headers 100 and 101, respectively.

Honeycomb structures are usually prepared by one of two processes: expansion or corrugation. To impart resiliency and memory, the corrugation method is preferred. Sheets of the material for forming the walls of the elongated cells 90 are preformed, usually between corrugating rollers, to give the correct corrugation (the aves 95). The sheets are then formed into the honeycomb by the application of appropriate adhesives. Alternatively, the honeycomb 85 can be extruded.

Optionally the elongated cells 90 can have perforated walls so that they are in liquid communication with adjacent cells through their walls. The perforations can be formed in the honeycomb 85 after the honeycomb is formed. Alternatively the perforations can be formed in the sheets of material for forming the walls of the elongated cells, before the sheets are corrugated. The perforations allow rapid fluid flow across cells so that the honeycomb structure can quickly regain its non-compressed first volume on removal of the compressive force.

Figure 6:
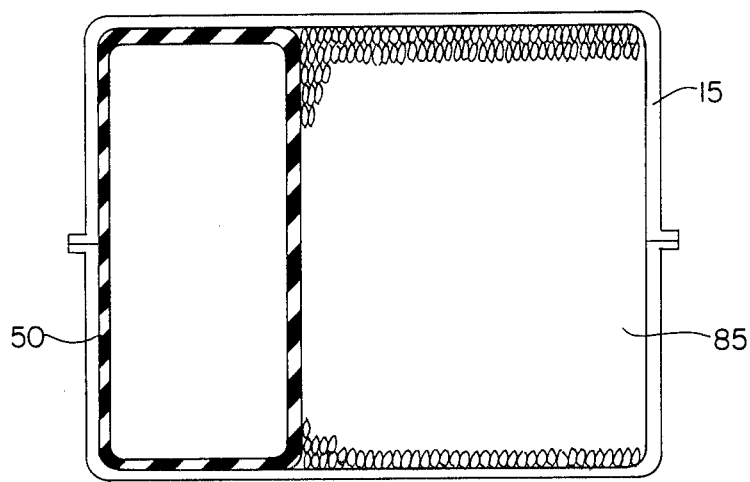
FIG. 6 is a cross-section view of the fuel tank of FIG. 5, along line 6—6, showing the inflatable bag partly inflated.

The honeycomb 85 and the headers 100 and 101 can be used in conjunction with either an inflatable bag 50 or a flexible bladder 60, or both, as described above, or with other compression means suitable for use with the sponge 35. One limitation is that the compression means should be disposed such that the compressive forces are substantially transverse to tne incompressible dimension of the honeycomb 85. Preferably the compressive forces are substantially perpendicular to the plane of the honeycomb 85 that offers the least resistance to compression. FIG. 6 shows the honeycomb 85 in use with an inflatable bag 50, which is partly inflated. If the honeycomb is placed inside a bladder, it is preferable that the honeycomb 85 be capable of swelling to a volume larger than that of the bladder so that the honeycomb 85, or any part of it, can soak up additional fuel when released from the bladder.

Figure 9:
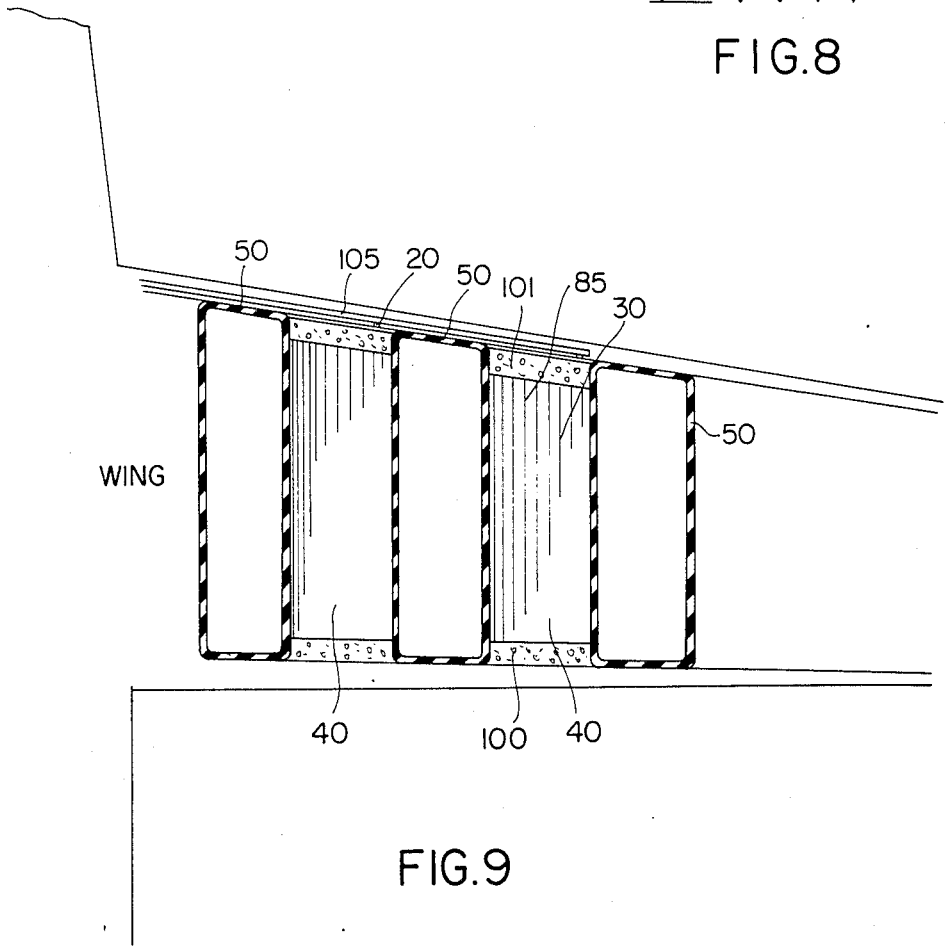
FIG. 9 shows part of an airplane wing tank containing a fuel tank of the present invention.

FIG. 9 shows an example of how the fuel tank of the present invention can be used in an airplane wing tank. Multiple compressible structures are placed within the wing tank. Each compressible structure 30, comprising a honeycomb 85 and the appropriate headers 100 and 101, is sandwiched between two inflatable bags 50. When the bags are pressurized, fuel 40 passes out of the compressible structures through outlet 21, and through fuel line 105 to the engines.

Preferably the honeycomb 85 is formed of a material which is incombustible or fire retardant, and which is compatible with the liquid fuel. Preferably the material is also heat shrinkable, such that the open ends of the tubular cells 90, when heated to a temperature above about 105° C., shrink to become substantially impervious to the liquid fuel, thereby retaining the liquid fuel within the honeycomb 85.

The heat-shrinkable material suitable for forming the sponge 35 or honeycomb 85 can be many of the polymers known is the art to be useful production of heat-recoverable articles. Generally the material is of constant composition throughout; however laminates of different polymers bonded or fused together may be used in certain instances. Suitable polymers include, for example, polyolefins, especially polyethylene, copolymers of ethylene and vinyl acetate, copolymers of ethylene and ethyl acrylate; chlorinated and fluorinated polymers, especially polyvinyl chloride, polyvinylidene fluoride and polymers incorporating units from vinylidene fluoride, and hexafluoroethylene; and rubbers such as ethylene/propylene rubber, chlorinated rubbers, e.g. Neoprene TM, and silicone rubbers which may be used in a blend with a crystalline or glassy polymer such as an olefin polymer. All of the above materials can, if desired, be cross-linked for example by irradiation and/or chemical means.

For both the sponge and honeycomb versions, liquid fuel 40 is normally retained within the capillary-sized cells (equivalent cross-sectional diameters less than about 0.005 inch) until the compressible structure 30 is compressed. Surface tension and capillary action keeps the bulk of the fuel within the compressible structure 30, even when it, or any part thereof, is being released from the container 15. When the container 15 is ruptured on impact, the bulk of the fuel remain inside the compressible structure 30. Less fuel is spilled, and therefore the risk of explosion is diminished.

The risk of explosion is even smaller when a flexible bladder is put around the sponge 35 or the honeycomb 85. When the container 15 is ruptured on impact, the fuel generally remains inside the bladder 60. In general the wall of a flexible bladder more difficult to rupture than the rigid walls of a conventional fuel tank, if all the walls have about the same tensile strength. On impact, the flexible bladder wall "gives" and the impact force is evenly distributed by the fuel inside the bladder to the inside surface of the bladder. Thus the impact force is distributed over a large area, and does less damage.

Even in the event that the bladder itself becomes torn, the resilient structure 30 retains the bulk of the fuel therein. Therefore the liquid fuel is prevented from being spilled over a large area to create an explosive situation. Even if the fuel near the outside of the structure 30 catches fire, the fire will not be sustained, because the structure 30 is non-wicking. Moreover, the surface of the structure 30 can shrink when exposed to heat (such as an open fire on the surface of the structure), so as to become impervious to the liquid fuel, and to retain the liquid fuel within the structure. Again the fire cannot be sustained without fuel. Overall, the particular combination described above is highly effective in preventing fuel tank explosions in vehicle collisions.

In the honeycomb versions, the high structural strength of a honeycomb structure is used to great advantage.

In use, the honeycomb 85 is oriented so that the elongated tubular cells are in line with the usual direction of travel of the vehicle. When the fuel tank is hit, it is more likely than not that the honeycomb 85 is hit with its incompressible dimension (along the length of the tubular cells) being normal to the surface of the object that hits it. Honeycomb structures are well known for their capability in dissipating and absorbing impact energy by permanent deformation along their substantially impressible axes. As compared to a conventional fuel tank, or even as compared to a fuel tank having a sponge 35 as the compressible structure, a fuel tank having the honeycomb-version of the compressible structure 30 suffers the least amount of permanent deformation on impact. The honeycomb structure acts as a reinforcing element within the tank. If a bladder 35 is also used, there is smaller chance of the bladder being ruptured on impact, as compared to the sponge version with the bladder. A large portion of the impact energy is absorbed by permanent deformation of the honeycomb structure, and the impact force is not fully brought to bear on the walls of the bladder 60.

Although the present invention has been described in considerable detail with reference to certain versions thereof, other versions are possible. Therefore, the spirit and scope of the appended claims should not necessarily be limited to the description of the preferred versions contained herein.

What is claimed is:

1. An explosion-resistant fuel tank suitable for use in a vehicle, the fuel tank comprising:
   (a) a container suitable for holding a liquid fuel therein;
   (b) an explosion resistant insert comprising at least one compressible, resilient structure comprising a plurality of cells for containing liquid fuel, the compressible structure decreasing in volume from a first volume to a reduced second volume when subjected to a compressive force, the reduced second volume being no more than about 75% of the first volume, compression of the structure forcing liquid fuel out of the structure, the structure being sufficiently resilient that when the compressive force is released the structure returns to its first volume for soaking up additional liquid fuel, the insert being inside the container; and
   (c) means for compressing the compressible structure to the reduced second volume such that liquid fuel passes out of the compressible structure.

2. The fuel tank of claim 1 wherein the compressible structure is formed of a non-combustible material that is compatible with the liquid fuel.

3. The fuel tank of claim 1 wherein the compressible structure is non-wicking.

4. The fuel tank of claim 1 wherein the compressible structure comprises cells with equivalent cross-sectional diameters of no more than about 0.005 inch.

5. The fuel tank of claim 1 wherein the compressible structure is formed of a heat-shrinkable material, wherein the surface of the compressible structure, when heated to a temperature above about 150° C., shrinks to become substantially impervious to the liquid fuel.

6. The fuel tank of claim 1 wherein the compressible structure comprises a sponge with interconnecting open pores.

7. The fuel tank of claim 6 wherein the sponge has pore sizes of no more than about 0.005 inch.

8. The fuel tank of claim 6 wherein the sponge comprises a heat-shrinkable material, wherein at least a portion of the sponge, when heated to a temperature above about 150° C., shrinks to become substantially impervious to the liquid fuels.

9. The fuel tank of claim 1 wherein the compressible structure is substantially incompressible along at least one of its dimensions.

10. The fuel tank of claim 9 wherein the incompressible dimension of the structure, when the fuel tank is installed in a vehicle, is substantially in line with the usual direction of travel of the vehicle.

11. The fuel tank of claim 9 wherein the compressible structure comprises an elongated honeycomb structure having tubular cells oriented side by side, wherein the honeycomb structure is substantially incompressible along the longitudinal axes of the tubular cells.

12. The fuel tank of claim 11 wherein the tubular cells have equivalent cross-sectional diameters of less than about 0.005 inch.

13. The fuel tank of claim 11 wherein the honeycomb structure is formed of a heat-shrinkable material, wherein the ends of the tubular cells, when heated to a temperature above about 150° C., shrink to become substantially impervious to the liquid fuel, thereby retaining the liquid fuel within the honeycomb structure.

14. The fuel tank of claim 11 wherein the walls of the tubular cells are perforated so that the cells are in liquid communication with adjacent cells through their walls.

15. The fuel tank of claim 1 wherein the compression means comprise at least one inflatable bag placed inside the container and proximate to the compressible structure, and means for inflating the bag such that compressive forces are applied on the compressible structure.

16. The fuel tank of claim 15 comprising at least two inflatable bags inside the container, wherein the compressible structure is situated between the bags.

17. The fuel tank of claim 1 further comprising a flexible bladder having an inlet and an outlet, the compressible structure being inside the bladder and both being inside the container.

18. The fuel tank of claim 17 wherein the compression means comprise means biasing the pressures at the outlet and the outside of the bladder.

19. The fuel tank of claim 17 wherein the compressible structure substantially fills the inside of the bladder.

20. The fuel tank of claim 17 wherein the compressible structure is capable of swelling to a volume larger than the volume of the bladder, for soaking up additional fuel, when the compressible structure is released from the bladder.

21. The fuel tank of claim 17 wherein the bladder is formed of a non-combustible material compatible with the liquid fuel.

22. The fuel tank of claim 17 wherein the bladder is formed of a rupture resistant material.

23. An explosion-resistant fuel tank suitable for use in a vehicle, the fuel tank comprising:
   (a) a container suitable for holding a liquid fuel therein;
   (b) an explosion resistant insert comprising at least one compressible, resilient structure comprising a plurality of cells for containing liquid fuel, the compressible structure decreasing in volume from a first volume to a reduced second volume when subject to a compressive force, the reduced second volume being no more than about 75% of the first volume, compression of the structure forcing the liquid fuel out of the structure, the structure being sufficiently resilient that when the compressive force is released the structure returns to its first volume for soaking up additional liquid fuel, the compressible structure being non-wicking, and comprising cells with equivalent cross-sectional diameters of no more than about 0.005 inch, the compressible structure being formed of a non-combustible, heat shrinkable material compatible with the liquid fuel, such that the surface of the compressible structure, when heated to a temperature above about 150° C., shrinks to become substantially impervious to the liquid fuel, the insert being inside the container; and (c) means for compressing the compressible structure to the reduced second volume such that the liquid fuel passes out of the compressible structure.

24. The fuel tank of claim 23 wherein the compressible structure is a sponge with interconnecting open pores, the pores having equivalent cross-sectional diameters of no more than about 0.005 inch.

25. The fuel tank of claim 24 further comprising a flexible bladder inside the container, the bladder having an inlet and an outlet, the bladder being formed of a rupture resistant, non-combustible material compatible with the liquid fuel, the sponge being inside the bladder and substantially filling the bladder, the sponge capable of swelling to a volume larger than the volume of the bladder when released from the bladder, for soaking up additional liquid fuel; and wherein the compression means comprise means biasing the pressures at the outlet and the outside of the bladder.

26. A vehicle equipped with the fuel tank of claim 25.

27. The fuel tank of claim 23 wherein the compressible structure is an elongated honeycomb structure having elongated tubular cells oriented side by side for containing a liquid fuel, the honeycomb structure being substantially incompressible along the longitudinal axes of the tubular cells, wherein when the fuel tank is installed in a vehicle, the incompressible dimension of the honeycomb structure is substantially in line with the usual direction of travel of the vehicle, the tubular cells of the honeycomb structure having equivalent cross-sectional diameters of no more than about 0.005 inch, the ends of the tubular cells when heated to a temperature above about 150° C. shrink to become substantially impervious to the liquid fuel, thereby retaining the liquid fuel within the honeycomb structure, the walls of the tubular cells being perforated such that the cells are in liquid communication with adjacent cells through their walls.

28. The fuel tank of claim 27 wherein the compression means comprise at least two inflatable bags placed inside the container and proximate to the honeycomb structure, with the honeycomb structure situated between the bags, and means for inflating the bags such that compressive forces are applied on the honeycomb structure, wherein the directions of the forces are substantially transverse to the substantially incompressible dimension of the honeycomb structure.

29. A vehicle equipped with the fuel tank of claim 28.

30. The fuel tank of claim 27 further comprising a flexible bladder inside the container, the bladder having an inlet and an outlet, the bladder being formed of a rupture resistant, non-combustible material compatible with the liquid fuel, the honeycomb structure being inside the bladder and substantially filling the bladder, the honeycomb structure capable of swelling to a volume larger than the volume of the bladder when released from the bladder, for soaking up additional liquid fuel;

wherein the compression means comprise means biasing tne pressures at the outlet and the outside of the bladder.

31. A fuel tank equipped with the fuel tank of claim 30.

* * * * *